US008561383B2

(12) United States Patent
Suciu et al.

(10) Patent No.: US 8,561,383 B2
(45) Date of Patent: Oct. 22, 2013

(54) TURBINE ENGINE WITH DIFFERENTIAL GEAR DRIVEN FAN AND COMPRESSOR

(75) Inventors: Gabriel L. Suciu, Glastonbury, CT (US); Gino J. Pagluica, Wells, ME (US); Loc Quang Duong, South Windsor, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 1645 days.

(21) Appl. No.: 11/719,228

(22) PCT Filed: Dec. 1, 2004

(86) PCT No.: PCT/US2004/039972
§ 371 (c)(1),
(2), (4) Date: May 14, 2007

(87) PCT Pub. No.: WO2006/059970
PCT Pub. Date: Jun. 8, 2006

(65) Prior Publication Data
US 2009/0074565 A1 Mar. 19, 2009

(51) Int. Cl.
*F02C 1/06* (2006.01)
*F02K 3/02* (2006.01)
*F02C 1/00* (2006.01)

(52) U.S. Cl.
USPC .................. 60/39.163; 60/772; 60/226.1

(58) Field of Classification Search
USPC ......... 60/268, 39.162, 226.1, 39.163; 415/61, 415/68–69; 416/128–129
See application file for complete search history.

(56) References Cited

U.S. PATENT DOCUMENTS

| 1,544,318 | A | 6/1925 | Hodgkinson |
| 2,221,685 | A | 11/1940 | Smith |
| 2,414,410 | A | 1/1947 | Griffith |
| 2,499,831 | A | 3/1950 | Palmatier |
| 2,548,975 | A | 4/1951 | Hawthorne |
| 2,611,241 | A | 9/1952 | Schulz |
| 2,620,554 | A | 12/1952 | Mochel et al. |
| 2,698,711 | A | 1/1955 | Newcomb |
| 2,801,789 | A | 8/1957 | Moss |
| 2,830,754 | A | 4/1958 | Stalker |
| 2,874,926 | A | 2/1959 | Gaubatz |
| 2,989,848 | A | 6/1961 | Paiement |
| 3,009,630 | A | 11/1961 | Busquet |
| 3,037,742 | A | 6/1962 | Dent et al. |
| 3,042,349 | A | 7/1962 | Pirtle et al. |

(Continued)

FOREIGN PATENT DOCUMENTS

| DE | 767704 | 5/1953 |
| DE | 765809 | 11/1954 |

(Continued)

*Primary Examiner* — Gerald L Sung
(74) *Attorney, Agent, or Firm* — Carlson, Gaskey & Olds, P.C.

(57) ABSTRACT

A gas turbine engine (10) provides a differential gear system (58) coupling the turbine (20) to the bypass fan (14) and the compressor (16). In this manner, the power/speed split between the bypass fan and the compressor can be optimized under all conditions. In the example shown, the turbine drives a sun gear (74), which drives a planet carrier (78) and a ring gear (80) in a differential manner. One of the planet carrier and the ring gear is coupled to the bypass fan, while the other is coupled to the compressor.

13 Claims, 3 Drawing Sheets

(56) References Cited

U.S. PATENT DOCUMENTS

| | | | |
|---|---|---|---|
| 3,081,597 | A | 3/1963 | Kosin et al. |
| 3,132,842 | A | 5/1964 | Tharp |
| 3,204,401 | A | 9/1965 | Serriades |
| 3,216,455 | A | 11/1965 | Cornell et al. |
| 3,267,667 | A | 8/1966 | Erwin |
| 3,269,120 | A | 8/1966 | Sabatiuk |
| 3,283,509 | A | 11/1966 | Nitsch |
| 3,286,461 | A | 11/1966 | Johnson |
| 3,302,397 | A | 2/1967 | Davidovic |
| 3,363,419 | A | 1/1968 | Wilde |
| 3,404,831 | A | 10/1968 | Campbell |
| 3,465,526 | A | 9/1969 | Emerick |
| 3,496,725 | A | 2/1970 | Ferri et al. |
| 3,505,819 | A | 4/1970 | Wilde |
| 3,616,616 | A | 11/1971 | Flatt |
| 3,635,576 | A * | 1/1972 | Wieckmann ............... 415/65 |
| 3,673,797 | A * | 7/1972 | Wilkinson ................ 60/600 |
| 3,684,857 | A | 8/1972 | Morley et al. |
| 3,703,081 | A | 11/1972 | Krebs et al. |
| 3,705,775 | A | 12/1972 | Rioux |
| 3,720,060 | A | 3/1973 | Davies et al. |
| 3,729,957 | A | 5/1973 | Petrie et al. |
| 3,735,593 | A | 5/1973 | Howell |
| 3,811,273 | A | 5/1974 | Martin |
| 3,818,695 | A | 6/1974 | Rylewski |
| 3,836,279 | A | 9/1974 | Lee |
| 3,861,822 | A | 1/1975 | Wanger |
| 3,866,415 | A * | 2/1975 | Ciokajlo ................ 60/226.1 |
| 3,932,813 | A | 1/1976 | Gallant |
| 3,979,087 | A | 9/1976 | Boris et al. |
| 4,005,575 | A | 2/1977 | Scott et al. |
| 4,130,379 | A | 12/1978 | Partington |
| 4,147,035 | A | 4/1979 | Moore et al. |
| 4,192,137 | A * | 3/1980 | Chappell et al. ............ 60/791 |
| 4,251,185 | A | 2/1981 | Karstensen |
| 4,251,987 | A | 2/1981 | Adamson |
| 4,265,646 | A | 5/1981 | Weinstein et al. |
| 4,271,674 | A | 6/1981 | Marshall et al. |
| 4,298,090 | A | 11/1981 | Chapman |
| 4,326,682 | A | 4/1982 | Nightingale |
| 4,452,038 | A | 6/1984 | Soligny |
| 4,463,553 | A | 8/1984 | Boudigues |
| 4,561,257 | A | 12/1985 | Kwan et al. |
| 4,563,875 | A | 1/1986 | Howald |
| 4,631,092 | A | 12/1986 | Ruckle et al. |
| 4,751,816 | A | 6/1988 | Perry |
| 4,785,625 | A | 11/1988 | Stryker et al. |
| 4,817,382 | A | 4/1989 | Rudolph et al. |
| 4,825,723 | A * | 5/1989 | Martin ..................... 475/332 |
| 4,827,712 | A * | 5/1989 | Coplin .................... 60/226.1 |
| 4,834,614 | A | 5/1989 | Davids et al. |
| 4,883,404 | A | 11/1989 | Sherman |
| 4,887,424 | A | 12/1989 | Geidel et al. |
| 4,904,160 | A | 2/1990 | Partington |
| 4,912,927 | A | 4/1990 | Billington |
| 4,916,894 | A * | 4/1990 | Adamson et al. ........... 60/226.1 |
| 4,965,994 | A | 10/1990 | Ciokajlo et al. |
| 4,999,994 | A | 3/1991 | Rud et al. |
| 5,010,729 | A | 4/1991 | Adamson et al. |
| 5,012,640 | A | 5/1991 | Mirville |
| 5,014,508 | A | 5/1991 | Lifka |
| 5,088,742 | A | 2/1992 | Catlow |
| 5,107,676 | A | 4/1992 | Hadaway et al. |
| 5,154,372 | A * | 10/1992 | Hora et al. ................. 244/62 |
| 5,157,915 | A | 10/1992 | Bart |
| 5,182,906 | A | 2/1993 | Gilchrist et al. |
| 5,224,339 | A | 7/1993 | Hayes |
| 5,226,350 | A * | 7/1993 | Cycon et al. ............. 74/665 F |
| 5,232,333 | A | 8/1993 | Girault |
| 5,267,397 | A | 12/1993 | Wilcox |
| 5,269,139 | A | 12/1993 | Klees |
| 5,275,536 | A | 1/1994 | Stephens et al. |
| 5,315,821 | A | 5/1994 | Dunbar et al. |
| 5,328,324 | A | 7/1994 | Dodd |
| 5,443,590 | A | 8/1995 | Ciokajlo et al. |
| 5,466,198 | A | 11/1995 | McKibbin et al. |
| 5,497,961 | A | 3/1996 | Newton |
| 5,501,575 | A | 3/1996 | Eldredge et al. |
| 5,537,814 | A | 7/1996 | Nastuk et al. |
| 5,584,660 | A | 12/1996 | Carter et al. |
| 5,628,621 | A | 5/1997 | Toborg |
| 5,679,089 | A * | 10/1997 | Levedahl ................. 475/332 |
| 5,746,391 | A | 5/1998 | Rodgers et al. |
| 5,769,317 | A | 6/1998 | Sokhey et al. |
| 6,004,095 | A | 12/1999 | Waitz et al. |
| 6,082,967 | A * | 7/2000 | Loisy ..................... 416/129 |
| 6,095,750 | A | 8/2000 | Ross et al. |
| 6,102,361 | A | 8/2000 | Riikonen |
| 6,158,207 | A | 12/2000 | Polenick et al. |
| 6,158,210 | A * | 12/2000 | Orlando ................. 60/226.1 |
| 6,223,616 | B1 | 5/2001 | Sheridan |
| 6,244,539 | B1 | 6/2001 | Lifson et al. |
| 6,364,805 | B1 | 4/2002 | Stegherr |
| 6,381,948 | B1 | 5/2002 | Klingels |
| 6,382,915 | B1 | 5/2002 | Aschermann et al. |
| 6,384,494 | B1 | 5/2002 | Avidano et al. |
| 6,430,917 | B1 | 8/2002 | Platts |
| 6,454,535 | B1 | 9/2002 | Goshorn et al. |
| 6,471,474 | B1 | 10/2002 | Mielke et al. |
| RE37,900 | E | 11/2002 | Partington |
| 6,513,334 | B2 | 2/2003 | Varney |
| 6,619,030 | B1 | 9/2003 | Seda et al. |
| 6,851,264 | B2 | 2/2005 | Kirtley et al. |
| 6,883,303 | B1 | 4/2005 | Seda |
| 6,910,854 | B2 | 6/2005 | Joslin |
| 7,021,042 | B2 | 4/2006 | Law |
| 7,214,157 | B2 | 5/2007 | Flamang et al. |
| 2002/0190139 | A1 | 12/2002 | Morrison |
| 2003/0031556 | A1 | 2/2003 | Mulcaire et al. |
| 2003/0131602 | A1 | 7/2003 | Ingistov |
| 2003/0131607 | A1 | 7/2003 | Daggett |
| 2003/0192304 | A1 | 10/2003 | Paul |
| 2004/0025490 | A1 | 2/2004 | Paul |
| 2004/0070211 | A1 | 4/2004 | Franchet et al. |
| 2004/0189108 | A1 | 9/2004 | Dooley |
| 2004/0219024 | A1 | 11/2004 | Soupizon et al. |
| 2004/0255590 | A1 * | 12/2004 | Rago et al. ................. 60/772 |
| 2005/0008476 | A1 | 1/2005 | Eleftheriou |
| 2005/0127905 | A1 | 6/2005 | Proctor et al. |
| 2006/0236675 | A1 * | 10/2006 | Weiler ................... 60/226.1 |
| 2007/0225111 | A1 * | 9/2007 | Duong et al. ............. 475/331 |
| 2008/0098718 | A1 * | 5/2008 | Henry et al. ............. 60/226.1 |
| 2009/0081039 | A1 * | 3/2009 | McCune et al. .......... 415/214.1 |
| 2009/0145102 | A1 * | 6/2009 | Roberge et al. ........... 60/39.162 |
| 2009/0151317 | A1 * | 6/2009 | Norris et al. ............. 60/39.162 |
| 2010/0105516 | A1 * | 4/2010 | Sheridan et al. ............ 475/346 |

FOREIGN PATENT DOCUMENTS

| | | |
|---|---|---|
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |

(56) References Cited

FOREIGN PATENT DOCUMENTS

| | | |
|---|---|---|
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006/059968 | 6/2006 |
| WO | 2006/059969 | 6/2006 |
| WO | 2006/059972 | 6/2006 |
| WO | 2006/059973 | 6/2006 |
| WO | 2006/059974 | 6/2006 |
| WO | 2006/059975 | 6/2006 |
| WO | 2006/059976 | 6/2006 |
| WO | 2006/059977 | 6/2006 |
| WO | 2006/059978 | 6/2006 |
| WO | 2006/059979 | 6/2006 |
| WO | 2006/059980 | 6/2006 |
| WO | 2006/059981 | 6/2006 |
| WO | 2006/059982 | 6/2006 |
| WO | 2006/059985 | 6/2006 |
| WO | 2006/059986 | 6/2006 |
| WO | 2006/059987 | 6/2006 |
| WO | 2006/059988 | 6/2006 |
| WO | 2006/059989 | 6/2006 |
| WO | 2006/059990 | 6/2006 |
| WO | 2006/059991 | 6/2006 |
| WO | 2006/059992 | 6/2006 |
| WO | 2006/059993 | 6/2006 |
| WO | 2006/059994 | 6/2006 |
| WO | 2006/059995 | 6/2006 |
| WO | 2006/059996 | 6/2006 |
| WO | 2006/059999 | 6/2006 |
| WO | 2006/060000 | 6/2006 |
| WO | 2006/060001 | 6/2006 |
| WO | 2006/060002 | 6/2006 |
| WO | 2006/060003 | 6/2006 |
| WO | 2006/060004 | 6/2006 |
| WO | 2006/060005 | 6/2006 |
| WO | 2006/060006 | 6/2006 |
| WO | 2006/060009 | 6/2006 |
| WO | 2006/060010 | 6/2006 |
| WO | 2006/060011 | 6/2006 |
| WO | 2006/060012 | 6/2006 |
| WO | 2006/060013 | 6/2006 |
| WO | 2006/060014 | 6/2006 |
| WO | 2006/062497 | 6/2006 |
| WO | 2006059980 | 6/2006 |
| WO | 2006059990 | 6/2006 |
| WO | 2006060003 | 6/2006 |
| WO | 2006/059971 | 8/2006 |
| WO | 2006/059970 | 10/2006 |
| WO | 2006/110122 | 10/2006 |
| WO | 2006/110125 | 10/2006 |
| WO | 2006/059997 | 11/2006 |
| WO | 2006/110124 | 11/2006 |
| WO | 2006/110123 | 12/2006 |
| WO | 2006/112807 | 12/2006 |

* cited by examiner

TURBINE ENGINE WITH DIFFERENTIAL GEAR DRIVEN FAN AND COMPRESSOR

This invention was conceived in performance of NASA contract NAS3-98005. The government may have rights in this invention.

BACKGROUND OF THE INVENTION

This invention relates to turbine engines and more particularly to a turbine engine using a differential gear to drive the fan and compressor.

A gas turbine engine, such as a turbo fan engine for an aircraft, includes a fan section, a compression section, a combustion section and a turbine section. An axis of the engine is centrally disposed within the engine and extends longitudinally through the sections. The core air flow path extends axially through the sections of the engine. A bypass air flow path extends parallel to and radially outward of the core air flow path.

The fan section includes a plurality of radially extending fan blades. The fan blades extend through the bypass flow path and interact with the air and transfer energy between the blades and air. A fan case circumscribes the fan in close proximity to the tips of the fan blades.

During operation, the fan draws the air into the engine. The fan raises the pressure of the air drawn along the bypass air flow path, thus producing useful thrust. The air drawn along the core air flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

In the known turbine engines, the turbine section drives the fan and the compressor at fixed relative rates. However this may not be the ideal power/speed split during all conditions.

SUMMARY OF THE INVENTION

A turbine engine according to the present invention provides a differential gear system coupling the turbine to the bypass fan and the compressor. In this manner, the power/speed split between the bypass fan and the compressor can be optimized under all conditions.

Although not limited to such a configuration, the embodiment shown for purposes of illustration includes an epicyclic differential gear, in particular, a planetary differential gear system. In this example, the turbine drives a sun gear, which drives a planet carrier and a ring gear in a differential manner. One of the planet carrier and the ring gear is coupled to the bypass fan, while the other is coupled to the compressor.

As an additional, optional feature, an amplifying gear system provides a speed increase from the turbine to the differential gear. In the example shown., the amplifying gear system is also an epicycle gear system, in particular, a star gear system. The turbine is coupled to a ring gear, which drives star gears mounted on a carrier mounted to static structure in the turbine engine. The star gears also drive a sun gear, which is coupled to the sun gear of the differential gear system.

In another optional feature, a tower shaft engages a high spool of the turbine aft of the turbine. The tower shaft provides rotational input to the turbine in order to start the turbine engine.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
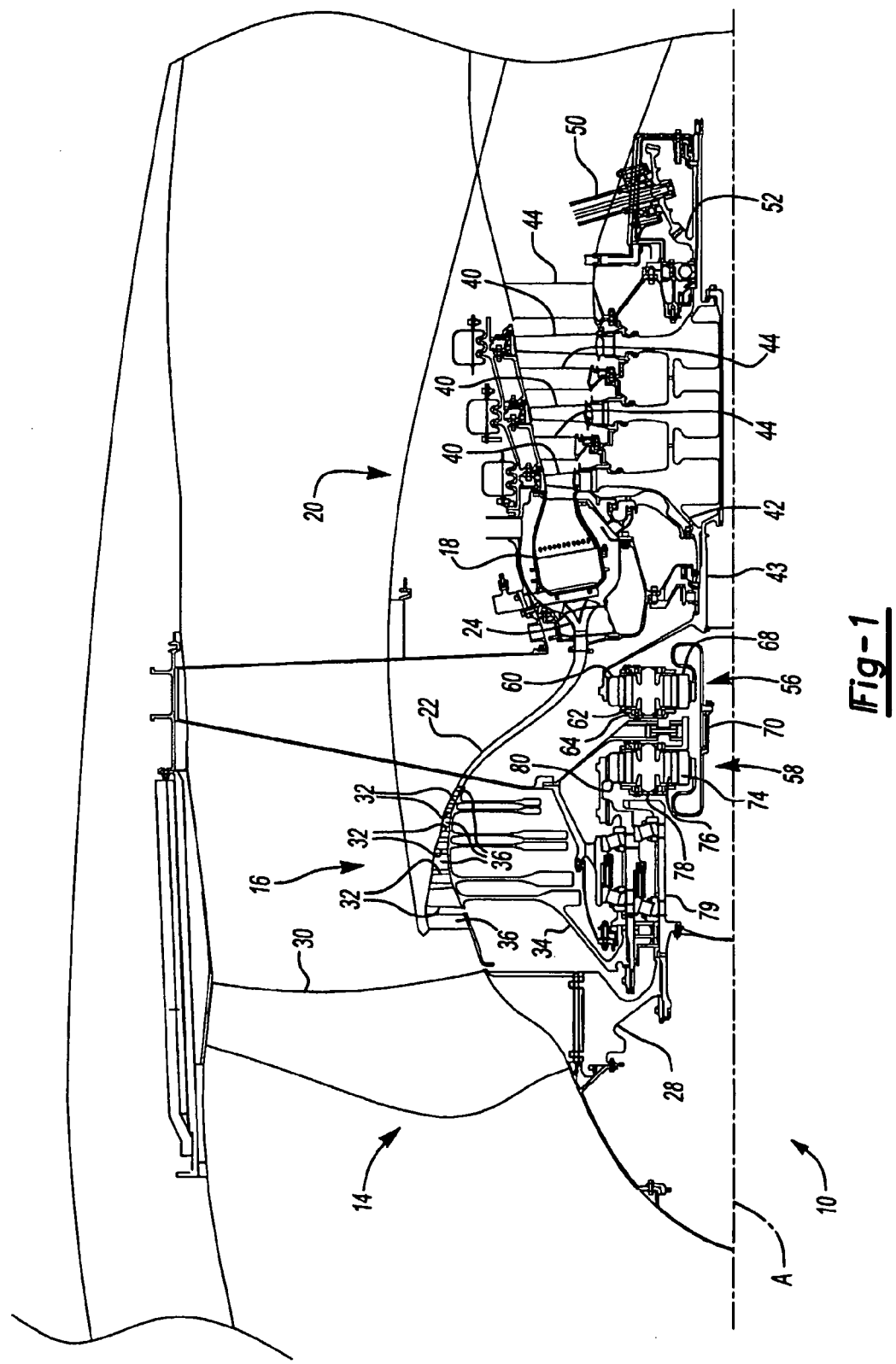
FIG. 1 is a partial sectional view of a turbine engine according to a first embodiment of the present invention.

A gas turbine engine 10 circumferentially disposed about an engine centerline A is shown in FIG. 1. The engine 10 generally includes a fan 14, a low pressure compressor 16, a combustor 18 and a turbine 20. Generally, air compressed in the low pressure compressor 16 is mixed with fuel which is burned in the combustor 18 and expanded in turbine 20. The air flow path through the low pressure compressor 16, through the combustor 18 and the turbine 20 may be referred to as the core air flow path 22.

The fan 14 includes a fan hub 28 and a plurality of fan blades 30. The plurality of fan blades 30 extends radially outwardly from the fan hub 28 across the bypass air flow path and the core air flow path.

The low pressure compressor 16 includes a plurality of blades 32 extending radially from a compressor rotor 34. A plurality of static vanes 36 extend between some adjacent pairs of rows of blades 32. The core air flow path 22 turns radially inwardly between the low pressure compressor 16 and a diffuser 24 leading to the combustor 18. The low pressure compressor 16 compresses the core air flow, which is then mixed with fuel and ignited in the combustor 18. The ignited fuel/core air flow mixture expands to create a high energy gas stream from the combustor 18.

The turbine 20 is downstream of the combustor 18 and includes a plurality of turbine blades 40 extending radially outwardly from a rotatable turbine rotor 42, which is coupled to a high spool 43. A plurality of static turbine vanes 44 alternate with the turbine blades 40.

At least one tower shaft 50 engages a bull gear 52 aft of the turbine 20. The tower shaft 50 rotatably drives the high spool 43 and the turbine 20 to start the turbine engine 10.

In the present invention, the turbine rotor 42 is coupled via a pair of gear systems 56, 58 to rotatably drive the bypass fan 14 and the compressor rotor 34. Generally, the first gear system 56 amplifies the rotational speed of the input from the turbine 20. The second gear system 58 is a differential gear system, providing optimum power/speed splits between the bypass fan 14 and the compressor rotor 34 of the low pressure compressor 16.

Figure 1A:
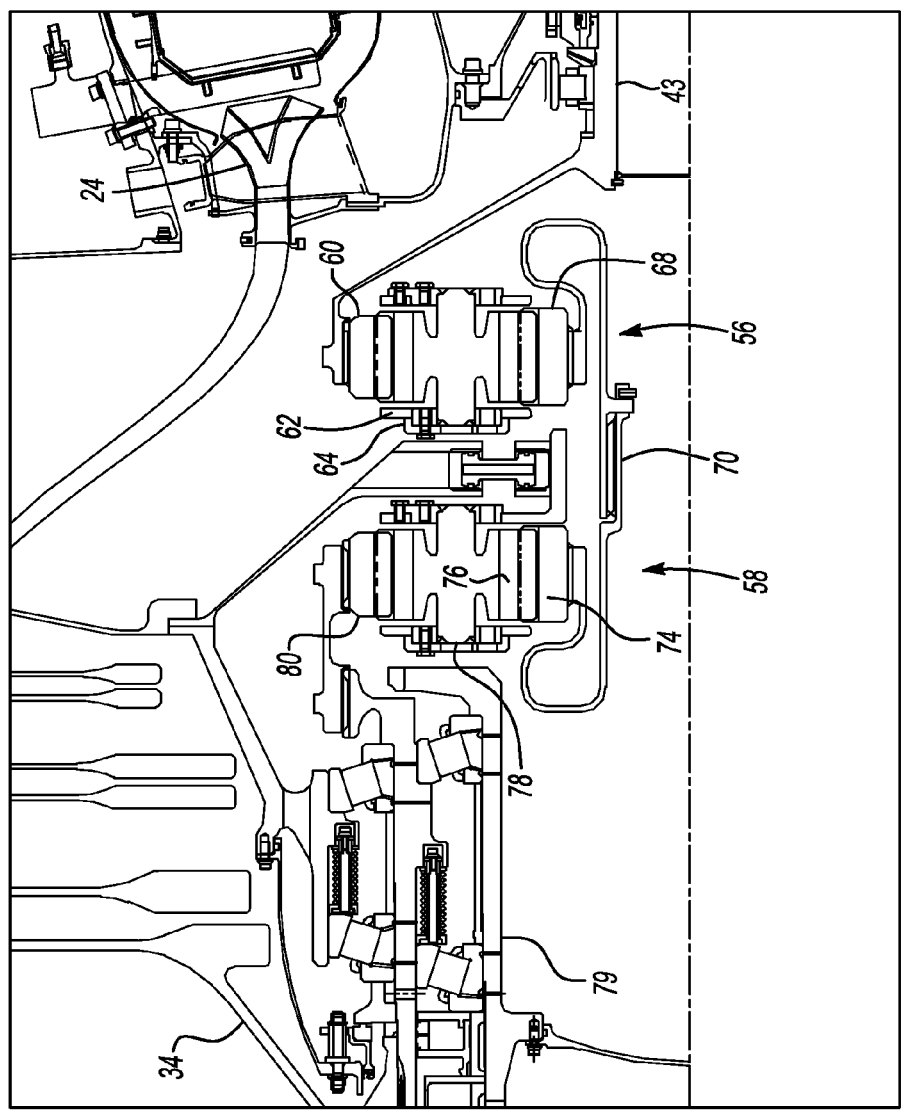
FIG. 1A is an enlarged view of the gear systems of FIG. 1.

Referring to FIG. 1A, the first gear system 56 shown is a star gear system in which the high spool 43 is directly coupled to a ring gear 60 which rotates with the turbine 20. The ring gear 60 engages a plurality of star gears 62 on a carrier 64 that is fixed to the static structure of the turbine engine 10. The star gears 62 engage a sun gear 68, which is the output of the first gear system 56. The first gear system 56 provides a rotational speed increase from the turbine to the sun gear 68 and also reverses the direction of rotation from the ring gear to the sun gear.

The sun gear 68 of the first gear system 56 is coupled, such as via a flex coupling 70, to a sun gear 74 on the second gear system 58. The sun gear 74 engages planet gears 76 on a planet carrier 78 that is coupled to the fan hub 28. via a fan shaft 79, such that the fan hub 28 rotates with the planet carrier 78. The planet gears 76 also engage a ring gear 80 that is coupled to the compressor rotor 34, such that the compressor rotor 34 rotates with the ring gear 80. Because the second gear system 58 is an epicyclic gear system, and more particularly a planetary gear system, with the ring gear 80, planet carrier 78 and sun gear 74 all un-fixed relative to the static structure of the turbine engine 10, the second gear system 58 acts like a differential gear system providing an optimum power/speed split between the compressor rotor 34 of the low pressure compressor 16 and the bypass fan 14. As one of the compressor rotor 34 and the bypass fan 14 encounters more resistance, more speed is transferred to the other of the compressor rotor 34 and the bypass fan 14.

In operation, the low pressure compressor 16 compresses the core air flow, which is then mixed with fuel and ignited in the combustor 18. The ignited fuel/core air flow mixture expands to create a high energy gas stream from the combustor 18, which rotatably drives the turbine blades 40. Rotation of the turbine rotor 42 drives high spool 43. The high spool 43 rotatably drives the ring gear 60 in the first gear system 56. The ring gear 60 rotatably drives the star gears 62 to drive the sun gear 68 at a higher rate, which is coupled to the sun gear 74 of the second gear system 58. Rotation of the sun gear 74 drives the bypass fan 14 via the planet carrier 78 and the low pressure compressor 16 via the ring gear 80. The second gear system 58 is a differential gear system, which varies the relative rotation rates of the bypass fan 14 and the low pressure compress 16 over time, based upon current conditions.

Figure 2:
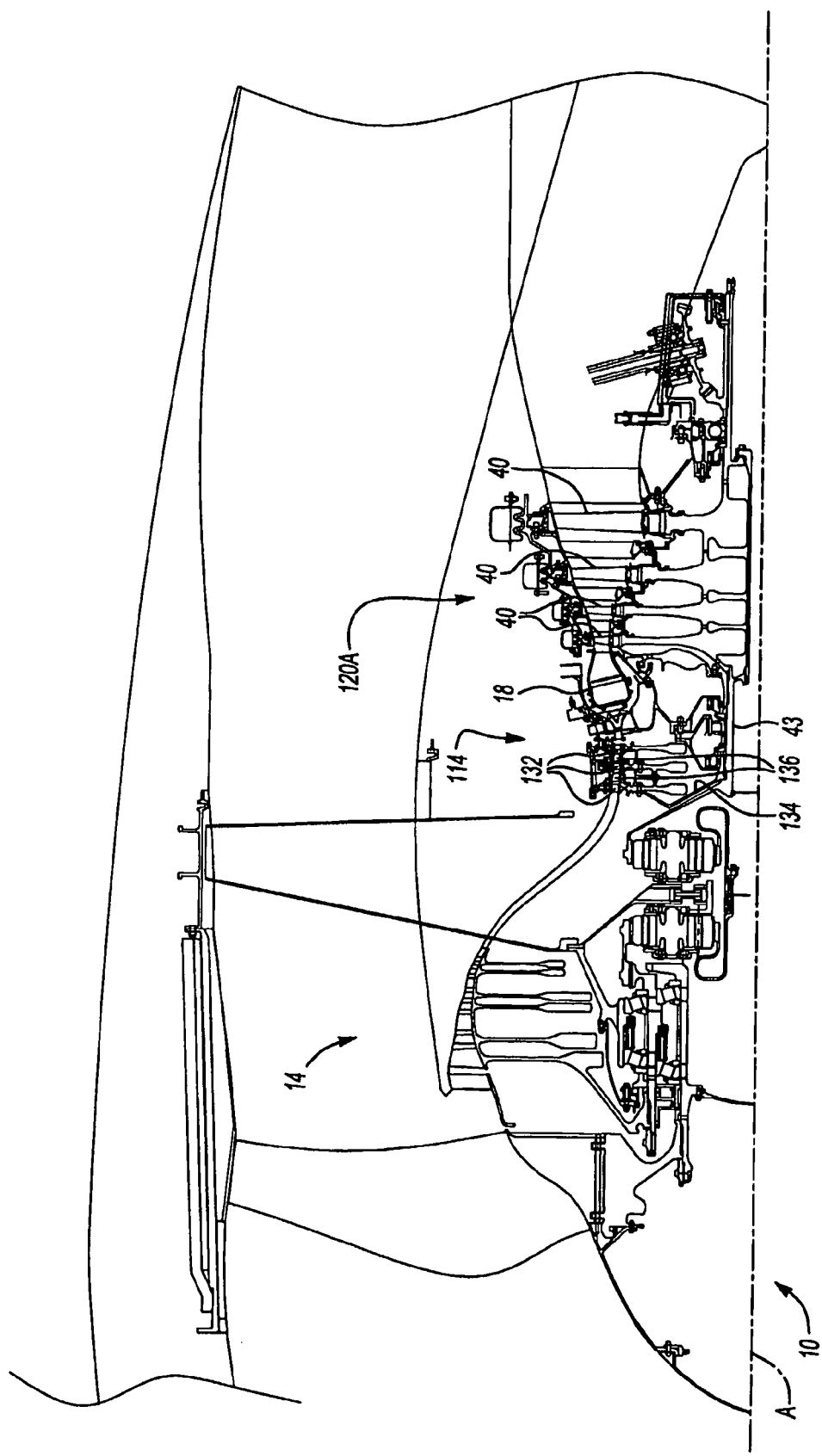
FIG. 2 is a partial sectional view of a turbine engine according to a second embodiment of the present invention.

FIG. 2 illustrates a turbine engine 110 according to an alternate embodiment of the present invention. The turbine engine 110 includes everything shown and described above with respect to the turbine engine 10 of FIG. 1. Therefore, that description will not be repeated. and only the differences will be described. The turbine engine 110 of FIG. 2 additionally includes a high pressure compressor 114 between the low pressure compressor 16 and the combustor 18. The high pressure compressor 114 is also radially inward of the low pressure compressor 16. The high pressure compressor 114 includes a plurality (three shown) of stages of compressor blades 132 extending radially from a compressor rotor 134 and alternating compressor vanes 136. The compressor rotor 134 is directly coupled to the high spool 43 such that the compressor rotor 134 of the high pressure compressor 114 rotates at the same rate as the turbine 20A.

The high pressure compressor 114 provides additional compression of the core air flow into the combustor 18. It is expected that this design would operate at an operating pressure ratio of approximately twice that of the first embodiment. Consequently, and to assist in driving the high pressure compressor 114, the turbine 20A includes an additional stage. of turbine blades 40 compared to the first embodiment.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
a turbine;
a fan driven at a first rate by the turbine;
a compressor downstream of the fan, the compressor driven at a second rate by the turbine, the first rate and the second rate varying relative to one another over time, the compressor including a compressor rotor from which a plurality of compressor blades extend radially; and
a planetary gear system providing a driving engagement between the turbine and the fan and between the turbine and the compressor, the planetary gear system including a sun gear, a planet carrier, at least one planet gear carried by the planet carrier and driven by the sun gear, and a ring gear driven by the planet gear; and
wherein the fan is coupled to the planet carrier, the compressor rotor coupled to the ring gear of the planetary gear system, the turbine coupled to the sun gear.

2. A turbine engine comprising:
a turbine;
a fan driven at a first rate by the turbine;
a compressor driven at a second rate by the turbine, the first rate and the second rate varying relative to one another over time, the compressor including a compressor rotor from which a plurality of compressor blades extend radially;
a planetary gear system providing a driving engagement between the turbine and the fan and between the turbine and the compressor, the planetary gear system including a sun gear, a planet carrier, at least one planet gear carried by the planet carrier and driven by the sun gear, and a ring gear driven by the planet gear; and
an amplifying gear system coupled between the turbine and the sun gear, the amplifying gear system increasing a rate of rotation of the sun gear relative to the turbine, wherein the fan is coupled to the planet carrier, the compressor rotor coupled to the ring gear of the planetary gear system, the turbine coupled to the sun gear.

3. The turbine engine of claim 2 wherein the planetary gear system is a differential planetary gear system and wherein the amplifying gear system is an amplifying star gear system.

4. The turbine engine of claim 3 wherein the turbine is coupled to a ring gear of the amplifying star gear system and wherein a sun gear of the amplifying star gear system is coupled to the sun gear of the differential planetary gear system.

5. The turbine engine of claim 2 wherein the compressor rotor is rotatable about an axis and wherein the fan is axially forward of the compressor.

6. The turbine engine of claim 5 wherein the fan is configured to move air downstream, which is axially rearward in the turbine engine.

7. The turbine engine of claim 6 wherein the compressor is downstream of the fan.

8. The turbine engine of claim 2 wherein the compressor is downstream of the fan.

9. A method for operating a turbine engine including the steps of:
driving a sun gear of a differential gear system with a turbine via an amplifying gear system at a rate of rotation higher than a rate of rotation of the turbine;
driving a bypass fan with a planet carrier of the differential gear system at a first rate; and
driving a compressor with a ring gear of the differential gear system at a second rate, a ratio of the first rate relative to the second rate varying over time.

10. The method of claim 9 wherein the compressor is downstream of the fan.

11. The method of claim 9 wherein the compressor is rotatable about an axis and wherein the fan is axially forward of the compressor.

12. The method of claim 11 wherein the fan is configured to move air downstream, which is axially rearward in the turbine engine.

13. The method of claim 12 wherein the compressor is downstream of the fan.

\* \* \* \* \*